Dec. 13, 1960
P. BARDET
2,964,285
DIRECT-PASSAGE VALVE
Filed Jan. 29, 1959
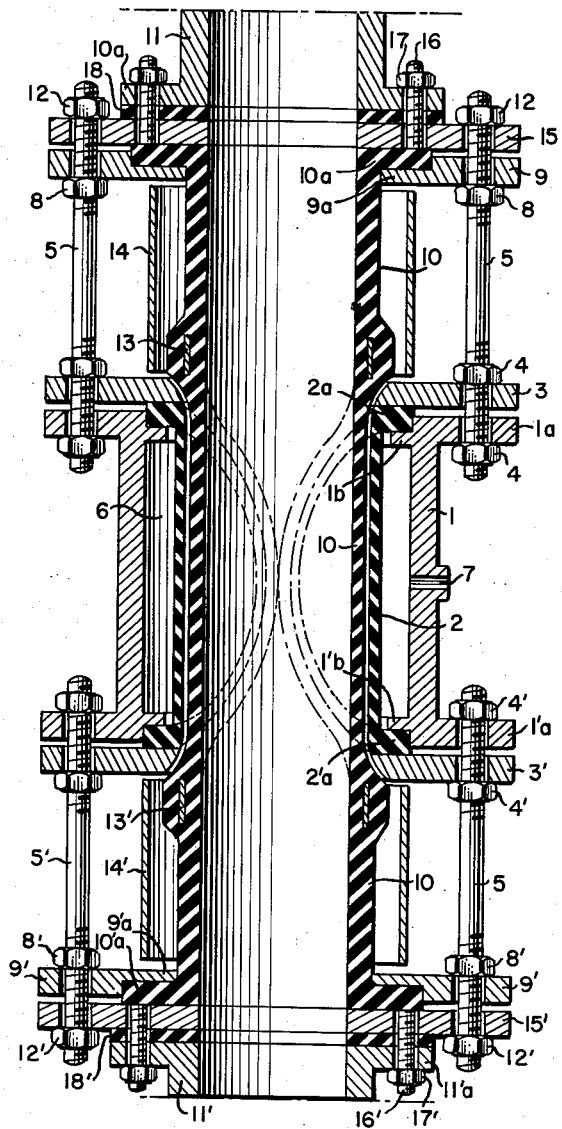
INVENTOR
PIERRE BARDET
BY Albert C. Johnston
ATTORNEY

2,964,285

DIRECT-PASSAGE VALVE

Pierre Bardet, l'Estaque, Marseille, France, assignor to Ste. des Ciments de Marseille et d'Outre-Mer, Marseille, France Filed Jan. 29, 1959, Ser. No. 789,962

Claims priority, application France Sept. 9, 1958

4 Claims. (Cl. 251—5)

The present invention is concerned with a direct-passage valve.

Valves are already well known which are essentially constituted by a body containing an elastic tube or sleeve through which a fluid or powdery material passes without offering any appreciable resistance to the circulation of this powder or fluid and which may be shut off by throttling the passage by a suitable means.

However, the valves of this type which are already in existence do not provide a sufficiently effective closure to resist differential pressures in excess of 2 kgs., due to the fact that the elastic tube or sleeve constituting the closure means does not have sufficient flexibility.

The object of the present invention is to provide a direct-passage valve which is capable of ensuring complete closure of the conveying circuit and of resisting pressures which are considerably greater than 2.5 kgs.

In addition, it has the advantage of being capable of use on circuits for conveying abrasive, acid, basic or other liquids without loss of pressure.

The valve constructed in accordance with the invention is constituted by a rigid cylindrical body provided at its two extremities with flanges, a sleeve of elastic material provided at its two extremities with collars resting against the valve body flanges; two counter-clamps which grip the collars of the elastic sleeve, thus forming an annular fluid-tight chamber between the said sleeve and the valve body; threaded tie-bolts which hold further clamps at a certain distance away from and on each side of the valve body; a closure diaphragm formed by a sleeve of elastic material and provided with collars gripped between the further clamps mentioned above and the counter-clamps which serve to secure the flanges of the conduits leading to the apparatus; and rigid safety sleeves encircling the portions of the closure diaphragm which are located on each side of the valve body within the open spaces formed by the tie-bolts.

The closure diaphragm is strengthened by two annular reinforcing members which are preferably embedded in the material forming the diaphragm, and located on each side of the valve body.

The closure diaphragm and the elastic sleeve may be made of natural rubber, synthetic rubber or any other flexible plastic material.

One form of construction of the valve forming the objects of the invention is described below with reference to the accompanying drawing, which shows the said valve in longitudinal cross-section.

In the form of construction shown, the valve is essentially composed of a cylindrical metal body 1, provided at its two extremities with flanges 1a and 1'a, preferably formed so as to provide seats 1b and 1'b.

The collars 2a and 2'a of a sleeve 2 of elastic material such as natural rubber, synthetic rubber or the like, rest on the seats 1b and 1'b. The said collars are clamped against their seats by the counter-clamps 3 and 3', which are drawn toward the flanges 1a and 1'a by nuts 4 and 4' which are screwed on the threaded ends of the tie-bolts 5 and 5'.

When fixed in this manner, the sleeve 2, together with the body 1, forms a chamber 6 into which a fluid may be injected under pressure through an orifice 7 formed in the wall of the body 1 and provided with a valve or other means of closure.

Further clamps 9 and 9', provided with seats 9a and 9'a are mounted on the tie-bolts 5 and 5' by means of nuts 8 and 8'. These further clamps 9 and 9' are supported against the collars 10a and 10'a formed at the extremities of a tubular elastic diaphragm 10 which constitutes the closure member of the valve.

The collars 10a and 10'a of the diaphragm 10 are gripped between the further clamps 9 and 9' and the counter-clamps 15 and 15' by the nuts 12 and 12'. The said counter-clamps 15 and 15' are provided with threaded studs 16 and 16' which enable the flanges 11a and 11'a of the conduits 11 and 11' of the conveying circuit to be fixed by means of nuts 17 and 17'. Sealing joints 18 and 18' are interposed between the flanges 11a and 11'a and the counter-clamps 15 and 15'.

The closure diaphragm 10, which may be either of natural or synthetic rubber, or of any other elastic material, is preferably provided with rigid annular armatures or reinforcements 13 and 13' which limit the deformation of the said diaphragm.

Spaced from opposite ends of the central body 1 are rigid sleeves 14 and 14' made of metal, for example, and intended to prevent any mishap due to accidental bursting of the diaphragm 10.

The operation of the valve is extremely simple, since it is merely necessary to inject a fluid under pressure into the chamber 6 through the orifice 7, in order to produce inflation of the sleeve 2 which then forces back the diaphragm 10 and throttles it around its periphery, as shown by the dotted lines in the accompanying drawing. As the pressure of the fluid acting on the diaphragm increases with respect to the pressure existing in the conveying circuits, the walls of the diaphragm are more powerfully forced into contact.

It is understood that modifications both in form and in detail may be made to the valve which is described above merely by way of example and not in any sense by way of implied limitation.

What I claim is:

1. A direct-passage valve comprising a cylindrical body having a flange at each of its extremities, a sleeve of elastic material having a collar at each of its extremities, each said collar being supported against one of said body flanges; two counter-clamps forcing said collars against said body flanges to form an annular fluid-tight chamber between said sleeve and said valve body; threaded tie-bolts maintaining further annular clamps spaced at a certain axial distance apart on each side of said valve body; a closure diaphragm formed by a tube of elastic material and surrounded by said sleeve; a collar formed at each extremity of said tube, each said tube collar being gripped between one of said further annular clamps and a further counter-clamp; fluid conduits for coupling to each extremity of said tube; a flange on each said conduit, said conduit flanges being fixed to said further counter-clamps; rigid safety sleeves enclosing the parts of said closure diaphragm located on each side of said valve body between said further clamps; and means for applying fluid under pressure to said annular chamber to close the valve passage by deforming inwardly the elastic wall of said diaphragm.

2. A direct-passage valve as claimed in claim 1, and further comprising at least two annular reinforcing members embedded in the wall of said diaphragm and located at least one on each side of said valve body, whereby deformation of said diaphragm is prevented, except along the length of said valve body.

3. A direct-passage valve as claimed in claim 1, in which said closure diaphragm and said elastic sleeve are made of rubber.

4. A direct-passage valve as claimed in claim 1, in which said closure diaphragm and said elastic sleeve are made of an elastic plastic material.

References Cited in the file of this patent

UNITED STATES PATENTS

| | | |
|---|---|---|
| 1,284,465 | Ryan | Nov. 12, 1918 |
| 1,772,210 | Dale | Aug. 5, 1930 |
| 2,904,063 | Wall | Sept. 15, 1959 |

FOREIGN PATENTS

| | | |
|---|---|---|
| 1,080,029 | France | of 1954 |